Oct. 23, 1923.
E. R. MONROE
BODY AND LIMB DEVELOPER
Filed June 26, 1922
1,471,749
2 Sheets-Sheet 2
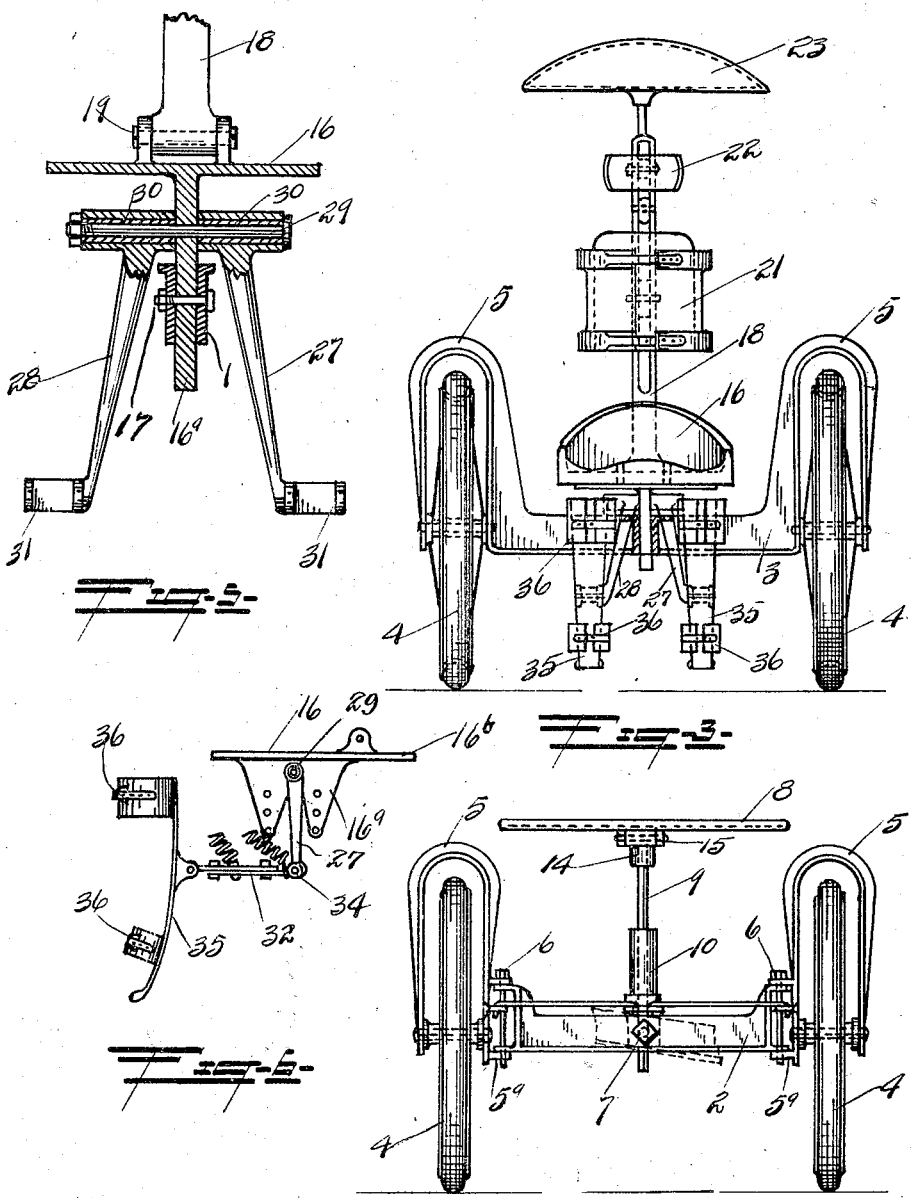
INVENTOR.
Edward R. Monroe
BY
Edward R Monroe
ATTORNEY.

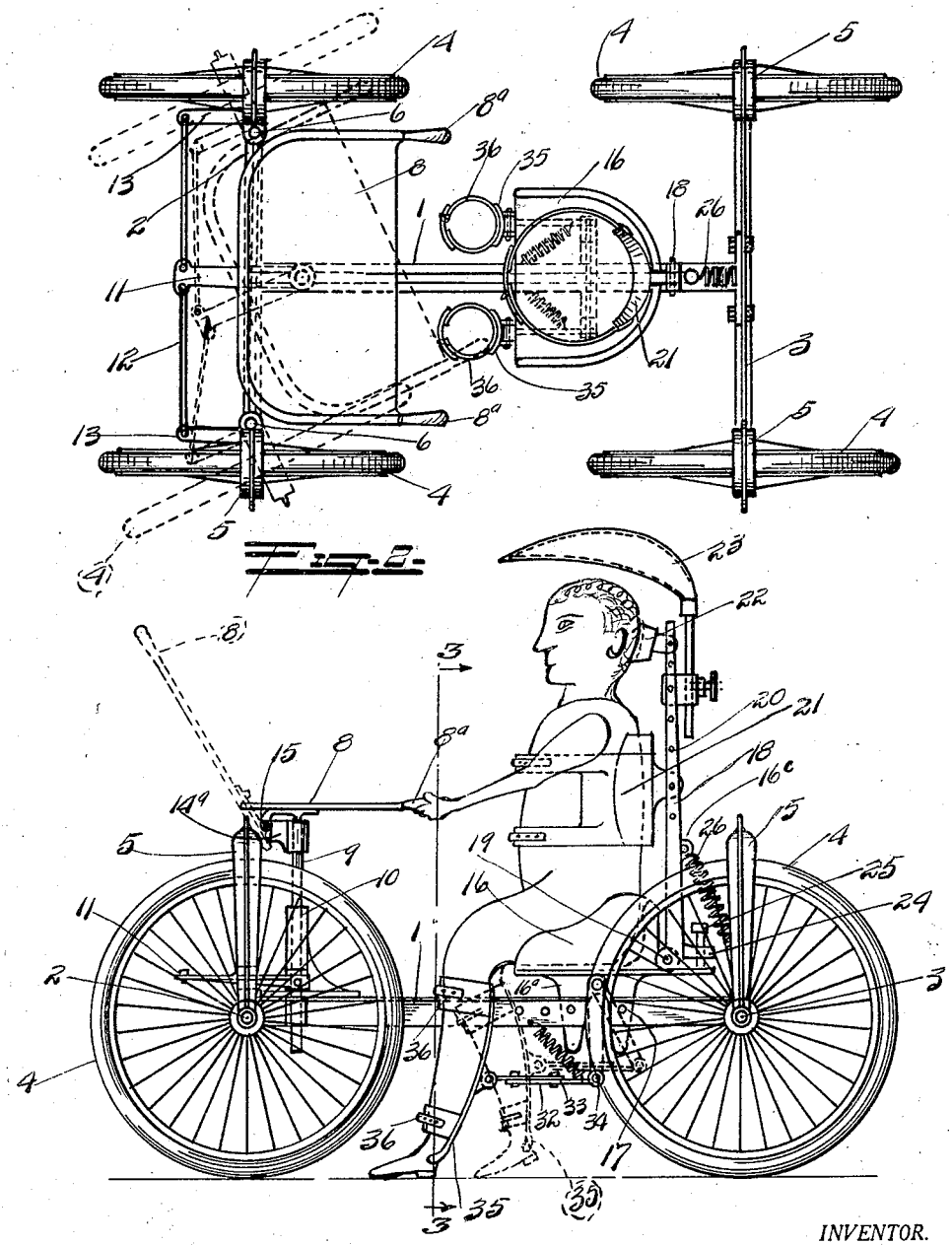

Patented Oct. 23, 1923.

1,471,749

UNITED STATES PATENT OFFICE.

EDWARD R. MONROE, OF BAY CITY, MICHIGAN.

BODY AND LIMB DEVELOPER.

Application filed June 26, 1922. Serial No. 570,944.

*To all whom it may concern:*

Be it known that I, EDWARD R. MONROE, a citizen of the United States of America, and a resident of Bay City, in the county of Bay and State of Michigan, have invented certain new and useful Improvements in Body and Limb Developers, of which the following is a specification.

This invention relates to body and limb developers, and particularly to a device for developing the muscles and limbs of physically deformed children and individuals who are unable to use their legs, arms or portions of their body in a normal manner.

One object of the invention is to provide a vehicle having resilient ground engaging wheels and equipped with braces having resilient means such as springs secured thereto for assisting the individual in taking steps and exercising the limbs and body.

Another object is to provide a vehicle having a tiltable steering member which can be tilted upwardly to provide ample space for the patient mounting or dismounting from the vehicle.

A still further object is to design a very durable, smooth, easily propelled vehicle, so that the occupant may propel it with the least possible effort, this is very essential as the majority of the patients have but very little strength in their limbs and body when first attempting to use the body and limb developer, they however gain considerable strength after using the device for a period of time.

With the above and other objects in view, the present invention consists in the combination and arrangement of parts, hereinafter more fully described, illustrated in the accompanying drawings, and particularly pointed out in the appended claims, it being understood that changes may be made in the form, size, proportion of the device and shape of the braces without departing from the spirit or sacrificing any of the advantages of the invention.

In the drawings:—

Fig. 1 is a side elevation of my improved developer illustrating a patient seated therein.

Fig. 2 is a top plan view of the developer.

Fig. 3 is a front sectional view taken on the line 3—3 of Figure 1 and looking in the direction of the arrows.

Fig. 4 is a front view illustrating the steering means and showing in dotted lines the position the front axle will assume when one wheel falls into a rut or hole.

Fig. 5 is an enlarged fragmentary sectional view illustrating the links to which the braces are secured.

Fig. 6 is an enlarged view of one of the leg braces.

Referring now particularly to the drawings in which I have shown the preferred embodiment of my invention, the device comprises a main frame made up of a central longitudinally extending member 1 having front and rear axles 2 and 3 respectively secured thereto, these axles being supported on the ground engaging wheels 4 in the usual manner, the rear axle extends up and over the wheels forming a yoke 5 integral with the axle, and between which the wheels are pivoted, in the front axle the yoke is formed separately and is provided with laterally extending lugs 5ª between which the ends of the front axle 2 are pivoted by means of the bolt member 6, and it will be obvious that these wheels are free to swing around this pivoting point as required.

The rear end of the center longitudinal member 1 is flared and is rigidly secured to the rear axle by means of bolts or the like, but the front end is pivotally secured to the front axle by means of the longitudinally extending bolt member 7 to allow the axle to pivot to compensate for unevenness in the ground and when one wheel is higher than the other.

A steering member 8 is provided and is formed with a flat depressed top on which toys, food, or other articles may be placed, handles 8ª extending therefrom and are adapted to be grasped by the occupant for steering the device, a shank 9 is rigid on the steering member and extends through a bearing member 10 secured to the frame member 1, a steering rod 11 is securely keyed on the shank 9 and rests on the frame 1 steering rods 12 being pivotally connected to this member 11, the opposite ends of the said rods being pivotally connected to outwardly extending arm 13 formed integral with the front yokes and it will be obvious that by turning the steering gear the front wheels can be turned accordingly.

A boss 14 is also secured on the shank 9 and is provided with a forked laterally extending ear 14ª to which the steering member 8 is pivotally attached by means of the pin 15 to enable the member to be swung upwardly as clearly shown in dotted lines in Fig. 1, the drawings, thereby providing ample space for the occupant to get into or leave the device, and this is an essential feature as the majority of patients have very little control or use of their limbs.

A seat 16 having downwardly projecting portions 16ª is secured between the center frame members by means of bolts 17, several holes being provided in order that the seat may be located to suit the occupant and a standard 18 is pivotally secured to the rear of the seat at the point 19, a series of openings 20 being provided intermediate its length and to which a corset 21 is secured, a head rest 22 also secured near the top of the standard together with a suitable top, or sun shade 23 which may be used when the occupant is in the sun, and it will be obvious that the corset, head rest and shade are adjustable to suit patients of different sizes. A lug 24 is formed integral with this standard, a threaded opening being provided therein and is adapted to receive an adjusting bolt 25 for adjusting the standard and limiting the backward movement thereof, the end of said bolt normally resting on a lip 16ᵇ which projects from the seat.

While the backward movement of the standard is limited, it may swing forwardly to accommodate the patient, a coiled spring 26 being anchored to the rear axle and to a lug 16ᶜ formed integral with the standard thereby forming a resilient mounting, so that whenever the patient leans forwardly the spring 26 will assist in bringing the body back to upright normal position.

Levers 27 and 28 are pivotally connected to the seat extensions 16ª by means of a bolt or pin 29, bushings 30 being provided to insure smooth and easy operation, the free ends of these levers being forked as shown at 31, and adjustable links 32 and 33 are pivoted to these links by means of pins 34, the opposite ends of these links are pivotally connected to braces 35 which are strapped to the leg of the patient by means of the straps 36, and it will be understood that these links must necessarily be lengthened or shortened to suit the patient, springs 37 are anchored to the links as shown, the opposite ends being anchored to the longitudinally extending frame members, and as the patient forces the legs forwardly and rests the foot on the floor, it will be necessary to exert a pressure on the foot to force the developer forward and this action is aided by the springs 37, therefor, movement of the developer is dependent on the patient's power and ability to exert a pressure on the muscles of the legs, continuous effort and the desire to move from one spot to another rapidly develops and builds up these leg muscles, so that in a comparatively short time the patient is able to propel himself without aid and in an entirely satisfactory manner. The movement of the developer is not altogether dependent upon the legs of the patient, as the muscles of the entire body are brought into play, this is especially noticeable in patients whose leg muscles are undeveloped and weak when first learning to operate the device. they will endeavor to move by throwing the body forwardly thereby utilizing momentarily, the momentum of the weight of body, the hands grasping the handles of the steering member for support, and aid in stretching the spring 26 thereby utilizing all of the muscles of the body.

While in the present instance I have shown a simple form of leg brace, it will be obvious that many different kinds and forms can be attached without departing from the spirit of my invention as each patient requires a slightly different type of brace which must ofttimes be changed as development progresses.

What I claim is:—

1. A body and limb developer comprising a frame, ground engaging wheels thereon, an adjustable seat, and body supporting means secured thereto, and leg braces pivotally and resiliently connected to the frame.

2. A body and limb developer comprising a frame, ground engaging wheels revolubly mounted thereon, an adjustable seat, a body support connected thereto and having resilient connection with the frame, and braces pivotally connected to the frame and adapted to be connected to legs of the patient.

3. A body and limb developer comprising a frame, front and rear axles having ground engaging wheels mounted thereon, means for steering the front wheels, an adjustable seat, a back support connected to the seat, a corset connected to the support and engaging the patient's body, and leg braces pivotally and resiliently connected to the frame and adapted to be connected to the legs of the patient.

4. A body and limb developer comprising a frame, front and rear axles having ground engaging wheels revolubly mounted thereon, the front axle having a central pivotal connection with the frame, means for steering the front wheels, an adjustable seat, a corset secured thereto, leg braces pivotally connected to the frame and adapted to be secured to the legs of the patient, and resilient means for normally drawing the braces forward.

5. A body and limb developer comprising a frame, a rear axle rigidly secured thereto, a front axle pivoted to the frame, wheels on the said axles, the front wheels having pivotal connection with the ends of the front axle, a steering post, a steering member pivotally connected thereto, links for connecting the steering post with said wheels, an adjustable seat on the frame, a body corset connected thereto, and a pair of leg braces connected to the frame and adapted to engage the patient's legs, and means for adjusting the brace connections.

In testimony whereof I affix my signature.

EDWARD R. MONROE.